US012670105B2

(12) United States Patent
Lin et al.

(10) Patent No.: US 12,670,105 B2
(45) Date of Patent: Jun. 30, 2026

(54) DATA STORAGE APPARATUS AND DATA PROCESSING METHOD

(71) Applicant: HUAWEI TECHNOLOGIES CO., LTD., Shenzhen (CN)

(72) Inventors: Han Lin, Shanghai (CN); Yuxuan Chen, Shenzhen (CN); Jianjiang Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 18/592,356

(22) Filed: Feb. 29, 2024

(65) Prior Publication Data

US 2024/0281381 A1 Aug. 22, 2024

Related U.S. Application Data

(63) Continuation of application No. PCT/CN2022/114735, filed on Aug. 25, 2022.

(30) Foreign Application Priority Data

Aug. 30, 2021 (CN) .......................... 202111008166.4

(51) Int. Cl.
*G06F 12/10* (2016.01)
*G06F 12/02* (2006.01)
(Continued)

(52) U.S. Cl.
CPC .......... *G06F 12/10* (2013.01); *G06F 12/0223* (2013.01); *G06F 12/0815* (2013.01); *G06F 12/1441* (2013.01); *G06F 12/1458* (2013.01)

(58) Field of Classification Search
None
See application file for complete search history.

(56) References Cited

U.S. PATENT DOCUMENTS

| | | | |
|---|---|---|---|
| 9,547,535 B1* | 1/2017 | Wilt | ......................... G06F 9/544 |
| 2014/0049548 A1* | 2/2014 | Rao | ........................... G06T 1/60 |
| | | | 345/565 |

(Continued)

FOREIGN PATENT DOCUMENTS

| | | |
|---|---|---|
| CN | 110019004 A | 7/2019 |
| GB | 2578135 A | 4/2020 |
| WO | 2021028723 A2 | 2/2021 |

OTHER PUBLICATIONS

MingliangWei et al.: "A Near-Memory Processor for Vector, Streaming and Bit Manipulation Workloads",in In The Second Watson Conference on Interaction between Architecture, Circuits, and Compilers, 2005. total 10 pages.

(Continued)

*Primary Examiner* — Kaushikkumar M Patel

(57) ABSTRACT

This application discloses a data storage apparatus and a data processing method. The data storage apparatus includes a memory and a first near-data processing NDP unit, the first NDP unit is electrically connected to the memory, and the data storage apparatus is connected to a processor through a bus. The first NDP unit is configured to store first physical address information. The information points to first address space, and the first address space is a section of contiguous memory space that the first NDP unit has permission to use. The memory is configured to store, in the first address space, first data from the processor. The first NDP unit is further configured to read a part or all of the first data from the first address space based on an obtained first offset address and the first physical address information, and perform computation.

20 Claims, 6 Drawing Sheets

Store first physical address information using a first NDP unit, where the first physical address information points to a first address space in a memory, and the first address space is a section of contiguous memory space that the first NDP unit has permission to use — S810

The memory stores, in the first address space, first data that is from a processor and that is used for near-data processing — S820

The first NDP unit reads a part or all of the first data from the first address space based on an obtained first offset address and the first physical address information; and performs computation based on the part or all of the first data — S830

(51) Int. Cl.
  G06F 12/0815    (2016.01)
  G06F 12/14    (2006.01)

(56)                References Cited

U.S. PATENT DOCUMENTS

| | | | | |
|---|---|---|---|---|
| 2019/0004800 | A1* | 1/2019 | Ong | ....................... G06F 9/3877 |
| 2020/0310694 | A1 | 10/2020 | Gao et al. | |
| 2021/0224213 | A1* | 7/2021 | Raj | ...................... G06F 15/7821 |
| 2022/0075713 | A1* | 3/2022 | Yoon | ................... G06F 9/30101 |
| 2022/0398032 | A1* | 12/2022 | Jeong | ................. G06F 15/7821 |
| 2023/0076599 | A1* | 3/2023 | Hung | ................. G06F 9/30072 |

OTHER PUBLICATIONS

Junwhan Ahn et al.: "A Scalable Processing-in-Memory Accelerator for Parallel Graph Processing",2015 ACM/IEEE 42nd Annual International Symposium on Computer Architecture (ISCA), Portland, OR, 2015 , total 13 pages.

Peng Gu et al.: "iPIM: Programmable In-Memory Image Processing Accelerator Using Near-Bank Architecture",2020 ACM/IEEE 47th Annual International Symposium on Computer Architecture (ISCA) , 2020,total 14 pages.

Junwhan Ahn et al.: "PIM-Enabled Instructions: A Low-Overhead, Locality-Aware Processing-in-Memory Architecture",, in Proceedings of the 42nd Annual International Symposium on Computer Architecture. ACM, 2015, total 13 pages.

Mingyu Gao et al: "Practical Near-Data Processing for In-memory Analytics Frameworks", in 2015 International Conference on Parallel Architecture and Compilation (PACT), Oct. 2015, total 12 pages.

Kevin Hsieh et al.: "Transparent Offloading and Mapping (TOM) Enabling Programmer-Transparent Near-Data Processing in GPU Systems",in 2016 ACM/IEEE 43rd Annual International Symposium on Computer Architecture (ISCA), Jun. 2016, total 42 pages.

"In-Memory Computing (IMC) Market—Size, Share and Growth Report" https://www.marketsandmarkets.com/Market-Reports/in-memory-computing-820.html , total 14 pages.

Zehra Sura et al.: "Data Access Optimization in a Processing-in-Memory System" in Proceedings of the 12th ACM International Conference on Computing Frontiers, ser. CF, 15. New York, NY, USA: ACM, 2015, total 8 pages.

* cited by examiner

Contiguous memory space

DATA STORAGE APPARATUS AND DATA PROCESSING METHOD

CROSS-REFERENCE TO RELATED APPLICATIONS

This application is a continuation of International Application No. PCT/CN2022/114735, filed on Aug. 25, 2022, which claims priority to Chinese Patent Application No. 202111008166.4, filed on Aug. 30, 2021. The disclosures of the aforementioned applications are hereby incorporated by reference in their entireties.

TECHNICAL FIELD

This application relates to the field of chip technologies, and in particular, to a data storage apparatus and a data processing method.

BACKGROUND

Near-data processing (NDP) is a technology for deploying a computing unit (such as a microprocessor unit (MPU)) near a storage device (such as a memory) to perform related data computing. This technology integrates the computing unit into the storage device through a high-bandwidth link, allowing the storage device to have some computing capabilities. The near-data processing technology can offload some computing tasks originally performed by a central processing unit (CPU) to the storage device with the computing capability. This greatly reduces long-distance data transmission between the CPU and the storage device, improves system performance, and reduces energy consumption.

In a near-data processing process, the computing unit configured to perform the computing task may access a memory by using a virtual address or a physical address, to obtain corresponding data to perform the computing task. When using the physical address to access the memory, the computing unit needs to interact with a processor for a plurality of times in a process of performing computation.

In the conventional technology, when the virtual address is used to access the memory, hardware complexity of the designed computing unit is high; when the physical address is used to access the memory, communication overheads and a data transmission amount on a bus are both large.

SUMMARY

Embodiments of this application provide a data storage apparatus and a data processing method, to avoid hardware overheads caused by address translation, and greatly improve computing performance and an energy consumption ratio in a near-data processing process.

According to a first aspect, this application provides a data storage apparatus. The data storage apparatus includes a memory and a first near-data processing NDP unit, the first NDP unit is electrically connected to the memory, and the data storage apparatus is connected to a processor through a bus. The first NDP unit is configured to store a first physical address information base address and a first length. The first physical address information base address and the first length point to first address space in the memory, and the first address space is a section of contiguous memory space that the first NDP unit has permission to use. The memory is configured to store, in the first address space, first data that is from the processor and that is used for near-data processing. The first NDP unit is further configured to: obtain a first offset address, and read a part or all of the first data from the first address space based on the obtained first offset address and first physical address information; and perform computation based on the part or all of the first data.

From the perspective of technical effects, in this application, the first NDP unit stores, in the first NDP unit, the first physical address information pointing to the first address space, so that addressing may be subsequently performed in the memory based on the physical address, and the first data used for near-data processing can be obtained from the contiguous first address space. Compared with a process of performing computation by using virtual address addressing in the conventional technology, this avoids an address translation process (that is, a translation process between the virtual address and the physical address) in the first NDP unit, and can effectively reduce hardware complexity of the first NDP unit. In addition, in a process of performing near-data processing by using the apparatus in this application, the processor interacts with the first NDP unit through the bus only when the processor allocates the first address space to the first NDP unit and writes data into the first address space. In a subsequent process of starting computation, the first NDP unit interacts with the memory in the storage apparatus through only a physical link, and does not need to interact with the processor side through the bus. Therefore, compared with the conventional technology, in this application, a quantity of interactions between the NDP unit and the processor side can be significantly reduced, that is, communication overheads and a data transmission amount on the bus can be significantly reduced. This greatly improves computing performance and an energy consumption ratio in the near-data processing process.

It should be understood that the data storage apparatus may include a plurality of NDP units, and a process of performing a computing task by each NDP unit is correspondingly the same as a process of performing a computing task by the first NDP unit.

The data storage apparatus may be a storage product having a programmable processing capability, for example, may be a general-purpose memory module or a magnetic disk. In an implementation, the first NDP unit includes a first register unit and a near-data processing core NDP core. The first NDP unit is configured to: store the first physical address information by using the first register unit; and obtain the first physical address information from the first register unit by using the NDP core, and read the part or all of the first data from the first address space based on the first physical address information and the first offset address.

From the perspective of technical effects, in this application, the first physical address information pointing to the first address space is stored in the register unit. Therefore, security of a memory access process can be ensured as long as it is ensured that data in the register unit is not illegally modified In an implementation, the first physical address information includes a first boundary address and a first length. The NDP core is configured to: when the first offset address is less than or equal to the first length, obtain a first access address through computation based on the first offset address and the first boundary address, where the first boundary address is a start physical address of the first address space or an end physical address of the first address space, and the first length is a length of the first address space; and read the part or all of the first data from the first access address in the first address space.

In an implementation, the first physical address information includes a second boundary address and a third boundary address. The NDP core is configured to: obtain a first access address through computation based on the first offset address and the second boundary address, or obtain the first access address through computation based on the first offset address and the third boundary address, where the second boundary address and the third boundary address are respectively a start physical address of the first address space and an end physical address of the first address space; and when the first access address is located between the second boundary address and the third boundary address, read the part or all of the first data from the first access address.

The first offset address is an offset relative to the start physical address or the end physical address of the first address space.

Optionally, the first physical address information may include at least two of the start physical address of the first address space, the end physical address of the first address space, and a length (that is, the first length) of the first address space.

From the perspective of technical effects, in the foregoing embodiment, it can be ensured that an access range of the NDP core is within a preset section of contiguous memory space (that is, the first address space) and does not exceed the contiguous memory space by using the manner of accessing the memory by the first NDP unit (that is, a computation manner of the first access address). This improves security of the memory access process.

In an implementation, the data storage apparatus further includes a second NDP unit, and the second NDP unit is electrically connected to the memory. The second NDP unit is configured to store second physical address information. The second physical address information points to second address space in the memory, and the second address space is a section of contiguous memory space that the second NDP unit has permission to use. The memory is configured to store, in the second address space, second data that is from the processor and that is used for near-data processing. The first NDP unit is further configured to: read a part or all of the second data from the second address space based on an obtained second offset address and the second physical address information; and perform computation based on the part or all of the second data.

From the perspective of technical effects, in a process of performing a computing task by the first NDP unit, the first NDP unit can access the first address space corresponding to the first NDP unit, and can also access address space corresponding to another NDP unit (for example, the second address space corresponding to the second NDP unit). That is, in a process of performing near-data processing in this embodiment of this application, when the first NDP unit needs to perform data interaction with the another NDP unit (for example, the second NDP unit), the data used for computing may be directly obtained from the second address space based on the stored second physical address information. Compared with the conventional technology in which address space corresponding to all other NDP units in the data storage apparatus need to be traversed, in this embodiment of this application, access of the first NDP unit to address space other than the first address space in the memory can be well extended.

In an implementation, the memory is further configured to receive instructions of the processor. The instructions instruct the memory to allocate the first address space to the first NDP unit, and instruct the memory to allocate the second address space to the second NDP unit.

In an implementation, the first NDP unit further includes a second register unit and a cache unit. When the first NDP unit is further configured to read the part or all of the second data from the second address space based on the obtained second offset address and the second physical address information, the first NDP unit is configured to: when the cache unit caches the second physical address information, obtain the second physical address information from the cache unit by using the NDP core, and update the second physical address information to the second register unit; and read the part or all of the second data from the second address space based on the obtained second offset address and the second physical address information by using the NDP core; or when the cache unit does not cache the second physical address information, obtain the second physical address information from the second NDP unit by using the NDP core, and update the second physical address information to the second register unit and the cache unit; and read the part or all of the second data from the second address space based on the obtained second offset address and the second physical address information by using the NDP core.

In a physical implementation, the cache unit may be a cache close to the NDP core, for example, may be a static random access memory SRAM. Logically, the cache unit may be understood as a data structure in which corresponding content is cached, for example, may be a form used to store a second physical base address and a second length.

From the perspective of technical effects, in this application, the cache unit is disposed in the first NDP unit to cache the obtained second physical address information. Therefore, when the second physical address information needs to be used again in a subsequent computing process, the second physical address information may be directly obtained from the cache unit to compute a corresponding access address, so that data used for near-data processing is read based on the access address obtained through computation. In this application, the foregoing cache mechanism is added to the near-data processing process. Therefore, a delay of the near-data processing process can be effectively reduced, and computing efficiency and an energy consumption ratio can be improved.

In an implementation, the second physical address information includes a fourth boundary address and a second length. When reading the part or all of the second data from the second address space based on the second offset address and the second physical address information by using the NDP core, the NDP core is configured to: read the fourth boundary address and the second length from the second register unit, where the fourth boundary address is a start physical address of the second address space or an end physical address of the second address space, and the second length is a length of the second address space; when the second offset address is less than or equal to the second length, obtain a second access address through computation based on the second offset address and the fourth boundary address; and read the part or all of the second data from the second access address in the second address space.

In an implementation, the second physical address information includes a fifth boundary address and a sixth boundary address. When reading the part or all of the second data from the second address space based on the second offset address and the second physical address information by using the NDP core, the NDP core is configured to: obtain a second access address through computation based on the second offset address and the fifth boundary address, or obtain the second access address through computation based on the second offset address and the sixth boundary address, where the fifth boundary address and the sixth boundary address are respectively a start physical address of the second address space and an end physical address of the second address space; and when the second access address is located between the fifth boundary address and the sixth boundary address, read the part or all of the first data from the second access address.

The second offset address is an offset relative to the start physical address or the end physical address of the second address space.

From the perspective of technical effects, in the foregoing embodiment, it can be ensured that an access range is within the second address space and does not exceed the second address space by using the manner of accessing the second address space in the memory by the first NDP unit. This ensures security of the memory access process.

From the perspective of technical effects, the NDP unit in the data storage apparatus does not sense the first data that is cached in the processor and that is used for near-data processing. Therefore, when there is no other mechanism for ensuring cache coherence in this application, data in the first address space cached in the processor needs to be cleared, to avoid a cache coherence problem.

In an implementation, the first register unit and the second register unit each includes at least one register.

The register unit may be a high-speed storage device having data storage and data read/write functions, and a data read/write speed of the register unit is far higher than that of an external storage device such as a hard disk or a USB flash drive (the external storage device is a storage device other than a memory of a computing device and a processor cache).

A quantity of registers in each register unit needs to meet a requirement for storing address information. Optionally, the first physical address information may be stored together in a same register, or may be separately stored in two registers. Similarly, the second physical address information may alternatively be stored in a same register, or may be separately stored in two registers. This is not limited in this application.

From the perspective of technical effects, the first physical address information is stored in the register. Therefore, security of a first memory access process can be ensured as long as it is ensured that data in the register is not illegally modified, that is, security is good.

In an implementation, the first NDP unit is further configured to send a second signal to the processor through the bus after near-data processing. The second signal indicates that the first NDP unit has completed near-data processing.

From the perspective of technical effects, when completing near-data processing, the first NDP unit may notify the processor side of a progress status of the first NDP unit, to ensure that the processor side can master a completion status of a near-data processing task of each NDP unit.

According to a second aspect, this application provides a data processing method, applied to a data storage apparatus. The data storage apparatus includes a memory and a first near-data processing NDP unit, the first NDP unit is electrically connected to the memory, and the data storage apparatus is connected to a processor through a bus. The method includes: storing first physical address information by using the first NDP unit. The first physical address information points to first address space in the memory, and the first address space is a section of contiguous memory space that the first NDP unit has permission to use. The memory stores, in the first address space, first data that is from the processor and that is used for near-data processing.

The first NDP unit reads a part or all of the first data from the first address space based on an obtained first offset address and the first physical address information; and performs computation based on the part or all of the first data.

In an implementation, the first NDP unit includes a first register unit and a near-data processing core NDP core. The storing first physical address information by using the first NDP unit includes: storing a first physical base address and a first length by using the first register unit. That the first NDP unit reads a part or all of the first data from the first address space based on an obtained first offset address and the first physical address information includes: The NDP core obtains the first physical address information from the first register unit, and reads the part or all of the first data from the first address space based on the first physical address information and the first offset address.

In an implementation, the first physical address information includes a first boundary address and a first length. The reading the part or all of the first data from the first address space based on the first physical address information and the first offset address includes: When the first offset address is less than or equal to the first length, the NDP core obtains a first access address through computation based on the first offset address and the first boundary address, where the first boundary address is a start physical address of the first address space or an end physical address of the first address space, and the first length is a length of the first address space; and the NDP core reads the part or all of the first data from the first access address in the first address space.

In an implementation, the first physical address information includes a second boundary address and a third boundary address. The reading the part or all of the first data from the first address space based on the first physical address information and the first offset address includes: The NDP core obtains a first access address through computation based on the first offset address and the second boundary address, or obtains the first access address through computation based on the first offset address and the third boundary address, where the second boundary address and the third boundary address are respectively a start physical address of the first address space and an end physical address of the first address space; and when the first access address is located between the second boundary address and the third boundary address, the NDP core reads the part or all of the first data from the first access address.

In an implementation, the data storage apparatus further includes a second NDP unit, and the second NDP unit is electrically connected to the memory. The method further includes: storing second physical address information by using the second NDP unit. The second physical address information points to second address space in the memory, and the second address space is a section of contiguous memory space that the second NDP unit has permission to use. The memory stores, in the second address space, second data that is from the processor and that is used for near-data processing. The first NDP unit reads a part or all of the second data from the second address space based on an obtained second offset address and the second physical address information; and performs computation based on the part or all of the second data.

In an implementation, the method further includes: The memory receives instructions of the processor. The instructions instruct the memory to allocate the first address space to the first NDP unit, and instruct the memory to allocate the second address space to the second NDP unit.

In an implementation, the first NDP unit further includes a second register unit and a cache unit. The reading a part or all of the second data from the second address space based on an obtained second offset address and the second physical address information includes: when the cache unit caches the second physical address information, obtaining the second physical address information from the cache unit by using the NDP core, and updating the second physical address information to the second register unit; and reading the part or all of the second data from the second address space based on the second offset address and the second physical address information by using the NDP core; or when the cache unit does not cache the second physical address information, obtaining the second physical address information from the second NDP unit by using the NDP core, and updating the second physical address information to the second register unit and the cache unit; and reading the part or all of the second data from the second address space based on the second offset address and the second physical address information by using the NDP core.

In an implementation, the second physical address information includes a fourth boundary address and a second length. The reading the part or all of the second data from the second address space based on the second offset address and the second physical address information by using the NDP core includes: reading the fourth boundary address and the second length from the second register unit by using the NDP core. The fourth boundary address is a start physical address of the second address space or an end physical address of the second address space, and the second length is a length of the second address space. When the second offset address is less than or equal to the second length, the NDP core obtains a second access address through computation based on the second offset address and the fourth boundary address; and the NDP core reads the part or all of the second data from the second access address in the second address space. In an implementation, the second physical address information includes a fifth boundary address and a sixth boundary address. The reading the part or all of the second data from the second address space based on the second offset address and the second physical address information by using the NDP core includes: The NDP core obtains a second access address through computation based on the second offset address and the fifth boundary address, or obtains the second access address through computation based on the second offset address and the sixth boundary address, where the fifth boundary address and the sixth boundary address are respectively a start physical address of the second address space and an end physical address of the second address space; and when the second access address is located between the fifth boundary address and the sixth boundary address, the NDP core reads the part or all of the first data from the second access address.

In an implementation, the first register unit and the second register unit each includes at least one register.

In an implementation, the method further includes: The first NDP unit sends a signal to the processor through the bus after the first NDP unit completes near-data processing. The signal indicates that the first NDP unit has completed near-data processing.

According to a third aspect, an embodiment of this application provides a data processing apparatus, including a processor, the data storage apparatus according to any implementation of the first aspect, and a discrete component coupled to the data storage apparatus.

According to a fourth aspect, an embodiment of this application provides a computer storage medium. The com- puter storage medium stores a computer program. When the computer program is executed, the data processing method according to any one of the implementations of the second aspect is implemented.

According to a fifth aspect, an embodiment of this appli- cation provides a computer program. The computer program includes instructions. When the computer program is executed, the data processing method according to any one of the implementations of the second aspect is implemented.

BRIEF DESCRIPTION OF DRAWINGS

The following describes accompanying drawings used in embodiments of this application.

DESCRIPTION OF EMBODIMENTS

Figure 1:
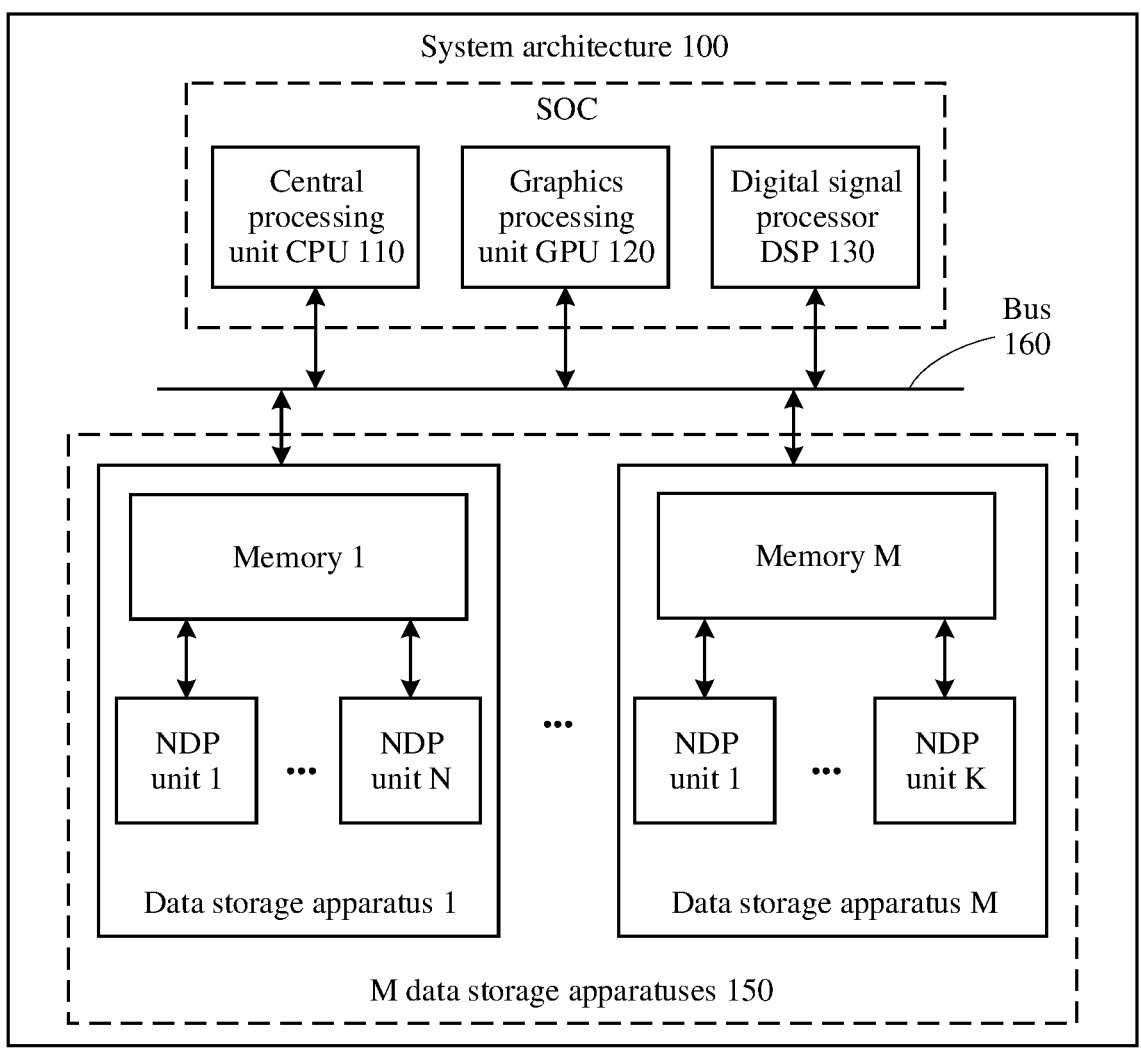
FIG. 1 is a diagram of a structure of a system architecture used for near-data processing according to an embodiment of this application.

The following describes embodiments of this application with reference to the accompanying drawings in embodi- ments of this application.

In this application, terms such as "first", "second", "third", and "fourth" in the specification, the claims, and the accompanying drawings are intended to distinguish between different objects but do not indicate an order. In addition, terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. An "embodiment" mentioned in this specifi- cation means that a particular feature, structure, or charac- teristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

First, terms related to embodiments of this application are explained.

(1) Near-data processing (NDP): a technology that deploys a computing unit near a storage device and aims to greatly reduce long-distance memory access requests, to resolve a memory access restriction problem, and improve overall performance and an energy consumption ratio.

(2) Cache coherence: in a computer system using a hierarchical storage system, a mechanism used to ensure that data in a cache is the same as that in a main memory. In a system, problems arise when many different devices share a common memory resource, and the data in the cache is inconsistent. If some shared data exists in caches of the different devices, data consistency in the caches of the different devices need to be ensured.

(3) Address translation: a translation process between a virtual address and a physical address. The virtual address is usually an address provided by a program, and the physical address is a valid memory address. A set of all virtual addresses is referred to as virtual address space, and a set of all physical addresses is referred to as physical address space. An address translation process may be simply understood as querying, by using a page table, a physical address corresponding to a virtual address, and a translation lookaside buffer (TLB) in an acronym and abbreviation table is a structure of hardware used to cache a part of the page table to accelerate a query process.

(4) Cache: a layer in a computer memory system, and located between a main memory and a processor. The cache is added to bridge a processing speed difference between the main memory and the processor. Compared with the main memory, the cache has a faster access speed but a smaller capacity. The cache can alternatively be divided into a plurality of layers. A layer closer to the CPU indicates a smaller capacity and a faster access speed.

(5) Through silicon via (TSV): a technology usually used in a 3D packaged memory, to connect a plurality of layers of structures in a chip in a vertical direction and provide a very high data transmission bandwidth.

(6) Stack: a section of special space used to store local variables and function call parameters and the like in the memory. The stack has a last in first out feature and usually grows from a high address to a low address.

(7) Energy consumption ratio: a performance/power consumption ratio, that is, a ratio of performance to power consumption. It usually indicates a performance level of a processor at a particular power consumption. A higher value indicates that the processor can perform much computation at fixed power consumption.

(8) Contiguous memory space: a section of contiguous storage space physically (in a memory). The memory space corresponds to a section of contiguous physical addresses.

(9) Offset address: an offset relative to a start physical address or an end physical address of corresponding address space.

FIG. 1 is a diagram of a structure of a system architecture used for near-data processing according to an embodiment of this application. As shown in FIG. 1, the system architecture 100 may include a central processing unit 110 (CPU), a graphics processing unit 120 (GPU), a digital signal processor 130 (DSP), M data storage apparatuses 150, and a bus 160. M is a positive integer.

The CPU, the GPU, and the DSP are connected to an MC through the bus 160, and the MC is directly connected to the M data storage apparatuses 150 through a physical connection line. The CPU, GPU, and DSP can be used as part of a system-on-chip (SOC). Each data storage apparatus may include one memory and one or more near-data processing NDP units. For example, a data storage apparatus 1 includes a memory 1 and N near-data processing NDP units, and the data storage apparatus M includes a memory M and K NDP units. The memory is directly connected to the NDP unit through a physical link, and N and K are positive integers.

The system architecture 100 may further include a memory controller (MC, not shown in FIG. 1) configured to control a data read/write operation in the data storage apparatus.

The data storage apparatus may be a storage product having a programmable processing capability, for example, may be a general-purpose memory module or a magnetic disk. The memory included in the data storage apparatus may be any one of a random access memory (RAM) or a non-volatile memory (NVM). The random access memory RAM includes a static random access memory (SRAM), a dynamic random access memory (DRAM), and the like. The non-volatile memory NVM includes a read-only memory (ROM), a flash memory, and the like.

The system architecture 100 may be included in any terminal device configured to perform near-data processing. The terminal device may be a mobile phone, a computer, a tablet, a wearable device, a vehicle-mounted terminal, or the like. The system architecture 100 may be applied to any scenario in which near-data processing needs to be performed, such as general-purpose computing, high-performance computing, or artificial intelligence. This is not limited in this application.

Figure 2:
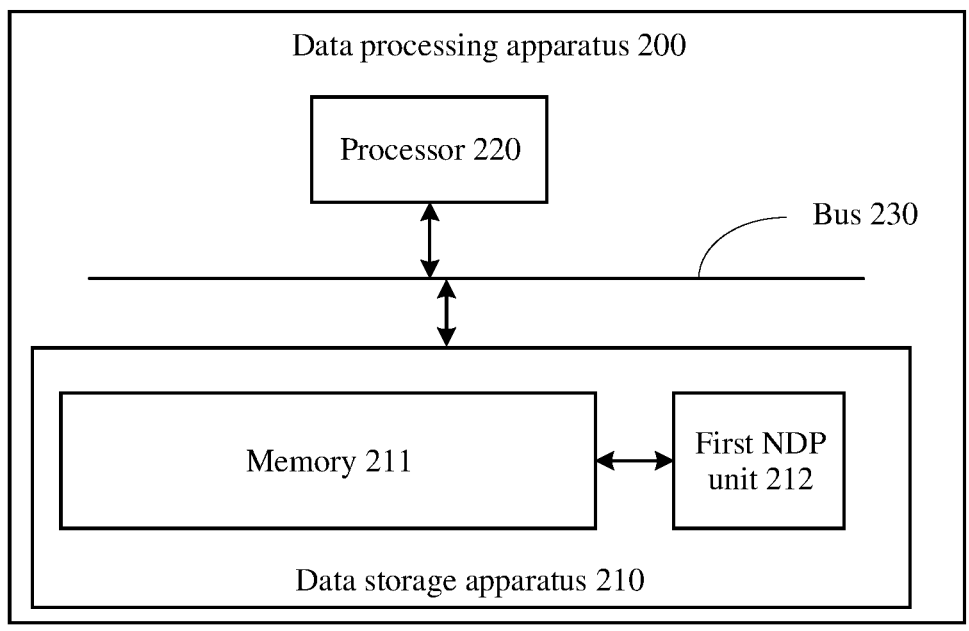
FIG. 2 is a diagram of a structure of a data processing apparatus according to an embodiment of this application.

FIG. 2 is a diagram of a structure of a data processing apparatus according to an embodiment of this application. As shown in FIG. 2, the data processing apparatus 200 is a data processing apparatus obtained based on the system architecture 100 used for near-data processing in FIG. 1, and includes a data storage apparatus 210, a processor 220, and a bus 230. The data storage apparatus 210 is connected to the processor 220 through the bus 230. The data storage apparatus 210 includes a memory 211 and a first NDP unit 212. The memory 211 is electrically connected to the first NDP unit 212.

Optionally, electrical connection may mean that the memory 211 is directly connected to the first NDP unit 212 through a physical line that can transmit an electrical signal, such as a copper foil or a conducting wire, that is, no other component is included between the memory 211 and the first NDP unit 212.

The data storage apparatus 210 may be any one of the M data storage apparatuses in FIG. 1. The data processing apparatus 200 may be any terminal device configured to perform near-data processing, such as a mobile phone, a computer, a tablet, a wearable device, or a vehicle-mounted terminal. The processor 220 may be a central processing unit (CPU) or another processing core. The processor 220 may alternatively be a heterogeneous processor, that is, processors of different types. A implementation solution of the processor is not described in this embodiment.

The first NDP unit 212 is configured to store first address information. The first address information points to first address space in the memory, and the first address space is a section of contiguous memory space allocated by the processor to the first NDP unit 212.

In a process in which the data processing apparatus 200 performs near-data processing, the processor 220 first performs initialization to allocate a section of contiguous memory space, that is, the first address space, in the memory 211 to the first NDP unit 212. The first address space may be a set of a series of contiguous physical addresses. After the processor 220 allocates the first address space to the first NDP unit 212, the first NDP unit 212 stores first physical address information that indicates a location of the first address space in the memory.

Optionally, the data processing apparatus 200 may run a segment of initialization code by using the processor 220 to perform a corresponding initialization process (which may also be referred to as a near-data processing task distribution process), to allocate a section of contiguous memory space in the memory 211 to the first NDP unit 212. The first NDP unit may be a central processing unit CPU, a microprocessor unit (MCU), or the like. This is not limited in this application.

The memory 211 is configured to store, in the first address space, first data that is sent by the processor and that is used for near-data processing.

Optionally, the data processing apparatus 200 may run the foregoing initialization code by using the processor 220, to write, into the first address space in the memory 211, the first data used for near-data processing. After allocating the corresponding first address space to the first NDP unit 212, the processor 220 may write the first data into the first address space through the bus 230.

Optionally, the contiguous memory space corresponding to the first address space in the memory 211 may be logically divided into a data block and a code block, which are respectively used to store data and code. That is, the first data used for near-data processing includes data and code. It should be noted that, in a paged memory management system, a size of the contiguous memory space allocated by the processor 220 is not limited by a page size.

The memory 211 may be any one of a random access memory (RAM) or a non-volatile memory (NVM). The random access memory RAM includes a static random access memory (SRAM), a dynamic random access memory (DRAM), and the like. The non-volatile memory NVM includes a read-only memory (ROM), a flash memory, and the like.

The first NDP unit 212 is further configured to: read a part or all of the first data from the first address space based on an obtained first offset address and the first physical address information; and perform computation based on the part or all of the first data.

Computation performed by the first NDP unit 212 may include one or more rounds of computing processes. In a process of each round of computation, the first NDP unit needs to read corresponding data from the memory 211. In one of the plurality of rounds of computing processes, the first NDP unit may read the part or all of the first data from the first address space first based on the obtained first offset address (which may also be referred to as a first offset), and then based on the first offset address and the first physical address information; and then performs computation based on the part or all of the read first data. Optionally, the first NDP unit 212 may obtain the first offset address from a code block (for example, an operand of a load or store instruction in the code block) in the first address space, a program counter (PC) register in the first NDP unit, or data read by the first NDP unit from the first address space in a previous round of computing process, and then read the part or all of the first data from the first address space based on the first physical address information and the first offset address.

From the perspective of technical effects, in this application, the first NDP unit stores, in the first NDP unit, the first physical address information pointing to the first address space, so that addressing may be subsequently performed in the memory based on the physical address, and the first data used for near-data processing can be obtained from the contiguous first address space. Compared with a process of performing near-data processing by using virtual address addressing in the conventional technology, this avoids an address translation process (that is, a translation process between the virtual address and the physical address) in the first NDP unit, and can effectively reduce hardware complexity of the first NDP unit. In addition, in a process of performing near-data processing by using the apparatus in this application, the processor interacts with the first NDP unit through the bus only when the processor allocates the first address space to the first NDP unit and writes data into the first address space. In a subsequent process of starting computation, the first NDP unit interacts with the memory in the storage apparatus through only a physical link, and does not need to interact with the processor side through the bus. Therefore, compared with the conventional technology, in this application, a quantity of interactions between the NDP unit and the processor side can be significantly reduced, that is, communication overheads and a data transmission amount on the bus can be significantly reduced. This greatly improves computing performance and an energy consumption ratio in the near-data processing process.

Figure 3:
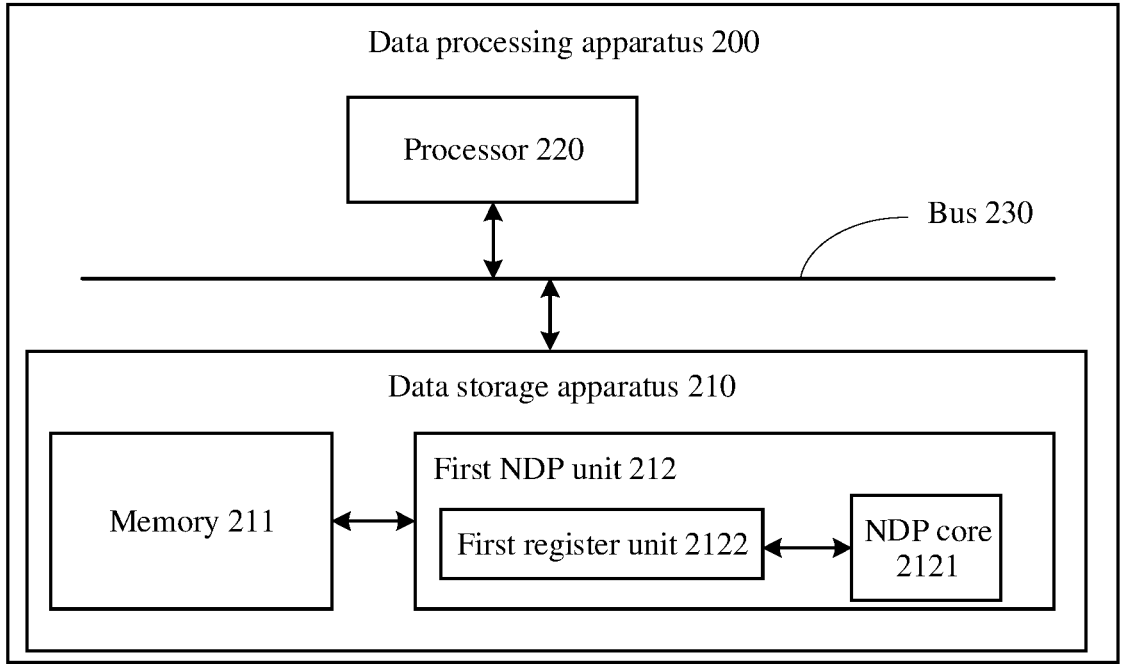
FIG. 3 is a diagram of a structure of another data processing apparatus according to an embodiment of this application.

FIG. 3 is a diagram of a structure of another data processing apparatus according to an embodiment of this application, and is used as a detailed description of the first NDP unit 212 in the data processing apparatus 200 in FIG. 2. As shown in FIG. 3, the first NDP unit 212 may include a near-data processing core NDP core 2121 and a first register unit 2122.

In an implementation, the first NDP unit 212 is configured to: store the first physical address information by using the first register unit 2122; and obtain the first physical address information from the first register unit by using the NDP core 2121, and read the part or all of the first data from the first address space based on the first physical address information and the first offset address.

A process in which the first NDP unit 212 reads data from the first address space based on the first physical address information and the first offset address is implemented by the NDP core 2121.

From the perspective of technical effects, in this application, the first physical address information pointing to the first address space is stored in the register unit. Therefore, security of a memory access process can be ensured as long as it is ensured that data in the register unit is not illegally modified In an implementation, the first physical address information includes a first boundary address and a first length. The NDP core is configured to: when the first offset address is less than or equal to the first length, obtain a first access address through computation based on the first offset address and the first boundary address, where the first boundary address is a start physical address of the first address space or an end physical address of the first address space, and the first length is a length of the first address space; and read the part or all of the first data from the first access address in the first address space.

The first offset address is an offset relative to the start physical address or the end physical address of the first address space.

Optionally, the first physical address information may include at least two of the start physical address of the first address space, the end physical address of the first address space, and a length (that is, the first length) of the first address space.

When the first physical address information includes the first boundary address and the first length, the NDP core 2121 first compares the first offset address with the first length. When the first offset address is less than or equal to the first length, the NDP core 2121 obtains the first access address through computation based on the first offset address and the first boundary address.

In this case, a process of computing the first access address based on the first offset address and the first boundary address includes four cases in total.

(1) When the first offset address is an offset relative to the start physical address of the first address space, and the first boundary address is the start physical address of the first address space, the NDP core 2121 adds the first boundary address and the first offset address to obtain the first access address.

(2) When the first offset address is an offset relative to the start physical address of the first address space, and the first boundary address is the end physical address of the first address space, the NDP core 2121 first subtracts the first length from the first boundary address, and then adds the first offset address, to obtain the first access address.

(3) When the first offset address is an offset relative to the end physical address of the first address space, and the first boundary address is the start physical address of the first address space, the NDP core 2121 adds the first length to the first boundary address, and then subtracts the first offset, to obtain the first access address.

(4) When the first offset address is an offset relative to the end physical address of the first address space, and the first boundary address is the end physical address of the first address space, the NDP core 2121 subtracts the first offset from the first boundary address, to obtain the first access address.

In an implementation, the first physical address information includes a second boundary address and a third boundary address. The NDP core is configured to: obtain a first access address through computation based on the first offset address and the second boundary address, or obtain the first access address through computation based on the first offset address and the third boundary address, where the second boundary address and the third boundary address are respectively a start physical address of the first address space and an end physical address of the first address space; and when the first access address is located between the second boundary address and the third boundary address, read the part or all of the first data from the first access address.

When the first physical address information includes the second boundary address and the third boundary address, the NDP core 2121 may first obtain the first access address through computation based on the second boundary address, the third boundary address, and the first offset address, then determine whether the obtained first access address through computation falls within the first address space, and when the first access address falls within the first address space, read the part or all of the first data from the first access address.

The foregoing obtaining the first access address through computation based on the second boundary address, the third boundary address, and the first offset address includes two cases.

(1) When the first offset address is an offset relative to the start physical address of the first address space, the NDP core 2121 adds the first offset address and the second boundary address to obtain the first access address.

(2) When the first offset address is an offset relative to the end physical address of the first address space, the NDP core 2121 subtracts the first offset address from the third boundary address, to obtain the first access address.

From the perspective of technical effects, when the first physical address information includes different content, the first access address obtained through computation by using the foregoing computational logic in this embodiment of this application may exactly fall within the first address space, that is, access of the first NDP unit 212 to the memory 211 does not exceed contiguous memory space (that is, the first address space) pre-allocated by the processor to the first NDP unit. Therefore, security of a process in which the first NDP unit 212 accesses the memory 211 can be improved. When the first offset address is greater than the first length or the obtained first access address through computation does not fall within the first address space, the first NDP unit may output a signal indicating that the access address is abnormal, to ensure security of a process in which the memory 211 is accessed.

Figure 4:
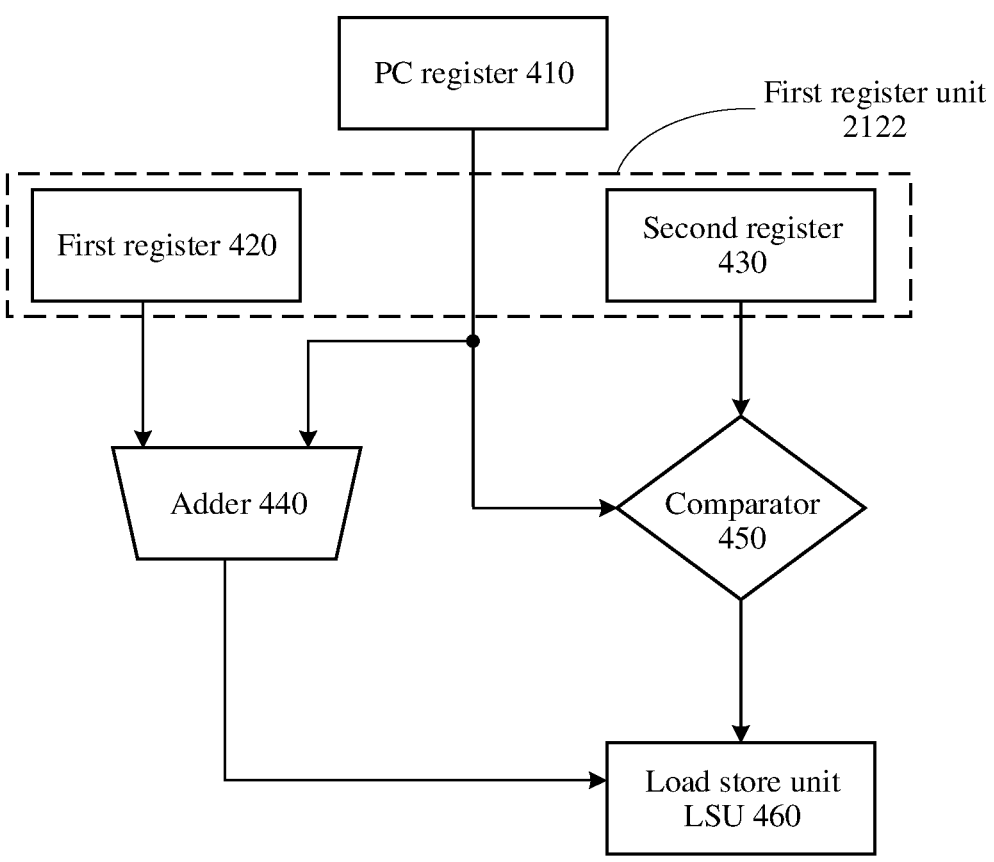
FIG. 4 is a diagram of computational logic of a memory access address according to an embodiment of this applica- tion.

FIG. 4 is a diagram of computational logic of a memory access address according to an embodiment of this application. The computing process may be implemented by a hardware module in a first NDP unit. As shown in FIG. 4, hardware modules used for computing the memory access address may include: a PC register 410, a first register 420, a second register 430, an adder 440, a comparator 450, and a load store unit (LSU) 460.

The following describes in detail a process of computing the first access address with reference to hardware logic shown in FIG. 4. The hardware module in FIG. 4 may be a part of the hardware module included in the first NDP unit 212.

In a process of computing the first access address, the PC register 410 is configured to store a first offset address. A first register unit 2122 includes a first register 420 and a second register 430. The first register 420 and the second register 430 may be configured to respectively store two types of information (a first boundary address and a first length, or a second boundary address and a third boundary address) in first physical address information. When the first register 420 and the second register 430 respectively store the first boundary address and the first length, the comparator 450 separately obtains the first offset address and the first length from the PC register 410 and the second register 430, and compares the first offset address and the first length. The adder 440 separately obtains the first offset address and the first boundary address from the PC register and the first register 420, and computes the first access address based on one of the four corresponding computation manners in the foregoing embodiment. The load store unit 460 determines, based on a comparison result of the comparator, whether to read data used for computation from the first access address in the memory 211. When the first offset address is less than or equal to the first length, the load store unit LSU reads data from the first access address in the first address space; or when the first offset address is greater than the first length, the load store unit LSU generates a signal indicating that the address is abnormal.

It should be understood that logic of computing the memory access address by using hardware shown in FIG. 4 is merely an example in this embodiment of this application. A person skilled in the art may use other hardware logic or software logic to compute the memory access address. This is not limited in this application.

Figure 5:
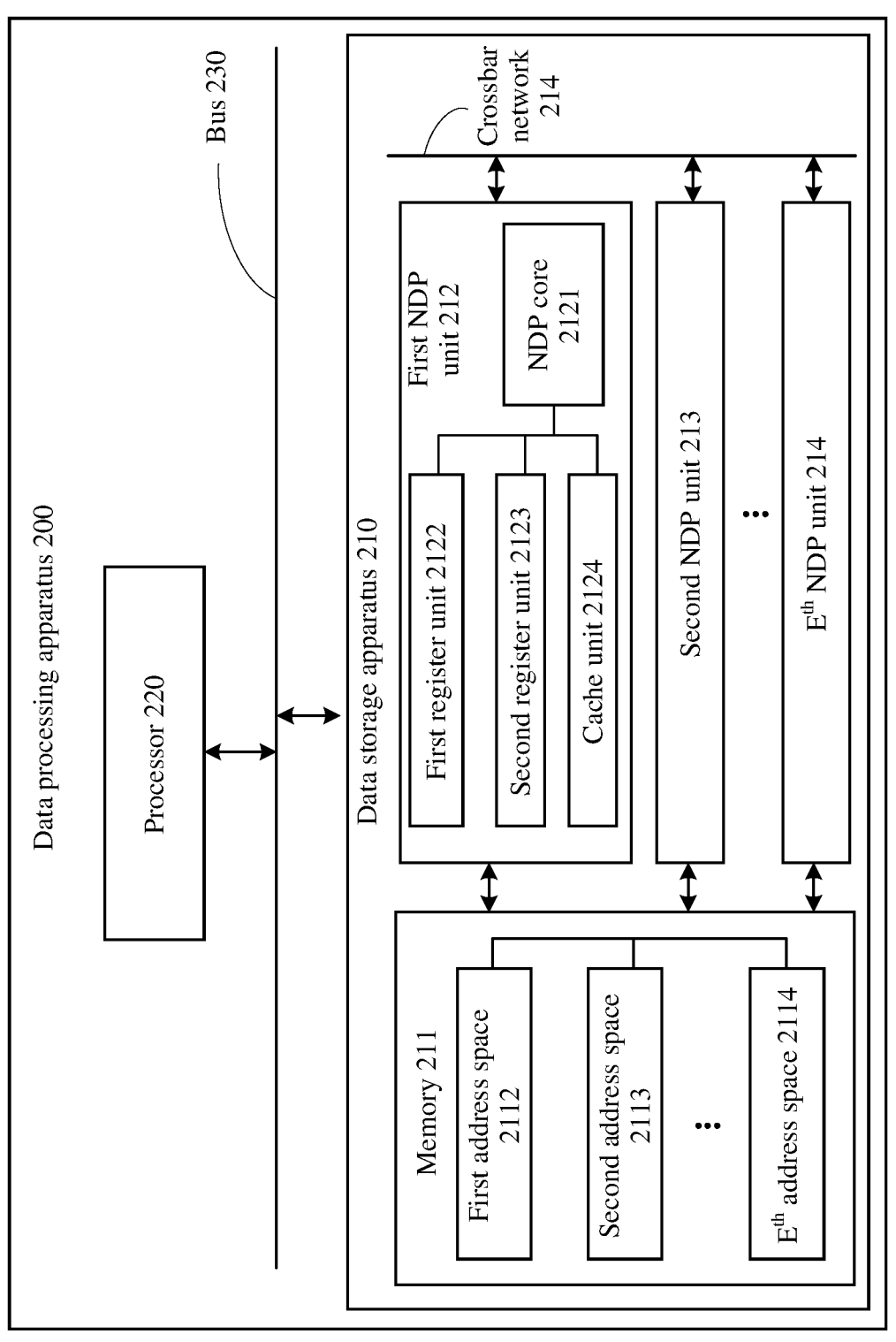
FIG. 5 is a diagram of a structure of still another data processing apparatus according to an embodiment of this application.

FIG. 5 is a diagram of a structure of still another data processing apparatus according to an embodiment of this application, and is used as a detailed description of some modules in the data processing apparatus 200 in FIG. 2 or FIG. 3. As shown in FIG. 5, the data storage apparatus 210 may include E NDP units (that is, a first NDP unit 212, a second NDP unit 213, . . . , and an $E^{th}$ NDP unit 214), and E is an integer greater than 2. The E NDP units separately correspond to E sections of contiguous memory space in the memory 211. The first address space 2112 is a section of contiguous memory space allocated by the processor 220 to the first NDP unit 212, the second address space 2113 is a section of contiguous memory space allocated by the processor 220 to the second NDP unit, . . . , and the $E^{th}$ address space 2114 is a section of contiguous memory space allocated by the processor 220 to the $E^{th}$ NDP unit. The foregoing E sections of address space may be allocated by the processor 220 at a time in an initialization process. The E NDP units are connected by using a crossbar network 214. The E NDP units are directly connected to the memory 211 separately through a physical link.

It should be understood that, for ease of description, FIG. 5 shows only an internal structure of the first NDP unit 212, and internal structures of other E−1 NDP units may be the same as or different from that of the first NDP unit 212. This is not limited in this application. The first NDP unit 212 in this embodiment of this application may be any one of the E NDP units included in the data storage apparatus 210.

In an implementation, the second NDP unit is configured to store second physical address information. The second physical address information points to second address space in the memory, and the second address space is a section of contiguous memory space that the second NDP unit has permission to use. The memory is configured to store, in the second address space, second data that is from the processor and that is used for near-data processing. The first NDP unit is further configured to: read a part or all of the second data from the second address space based on an obtained second offset address and the second physical address information; and perform computation based on the part or all of the second data.

Optionally, in a process in which the processor 220 runs initialization code to distribute a near-data processing task of each NDP unit, the processor 220 allocates a section of contiguous memory space, that is, the second address space 2113, in the memory 211 to the second NDP unit 213. The second address space 2113 is indicated by a second physical base address and a second length. A start physical address of the second address space 2113 is the second physical base address, and a length of the second address space 2113 is the second length. The second address space 2113 is a set of contiguous physical addresses. In addition, in a process in which the processor 220 distributes the near-data processing task, after allocating the second address space 2113 to the second NDP unit 213, the processor 220 is further configured to write, into the second address space 2113 through the bus 230, second data used for near-data processing.

Optionally, a manner of obtaining the second offset address by the first NDP unit 212 may be correspondingly the same as a manner of obtaining the first offset address, and details are not described herein again.

It should be understood that a process in which the first NDP unit 212 reads the part or all of the second data from the second address space to perform computation may be one of one or more rounds of computing tasks performed by the first NDP unit 212.

From the perspective of technical effects, the first NDP unit may read corresponding data from the first address space 2112 allocated by the processor 220 to the first NDP unit for computation, and also read corresponding data from the contiguous memory space allocated by the processor 220 to another near-data processing unit for computation. That is, two NDP units that need to interact data need only to perform point-to-point communication, and do not need to perform global synchronization. Therefore, in this embodiment of this application, each NDP unit accesses remote address space in the memory with good extendability.

It should be understood that, in this embodiment of this application, only an process of performing computation by the NDP unit is described by using the first NDP unit 212 as an object. When the data storage apparatus 210 includes a plurality of NDP units, a computing process performed by each NDP unit is correspondingly the same as that performed by the first NDP unit 212 in this embodiment of this application. Details are not described herein again.

In an implementation, the memory is further configured to receive instructions of the processor. The instructions instruct the memory to allocate the first address space to the first NDP unit, and instruct the memory to allocate the second address space to the second NDP unit.

That is, the first address space and the second address space are contiguous memory space respectively allocated by the processor to the first NDP unit and the second NDP unit.

In an implementation, the first NDP unit further includes a second register unit and a cache unit. When the first NDP unit is further configured to read the part or all of the second data from the second address space based on the obtained second offset address and the second physical address information, the first NDP unit is configured to: when a cache unit caches the second physical address information, obtain the second physical address information from the cache unit by using the NDP core, and update the second physical address information to the second register unit; and read the part or all of the second data from the second address space based on the obtained second offset address and the second physical address information by using the NDP core; or when the cache unit does not cache the second physical address information, obtain the second physical address information from the second NDP unit by using the NDP core, and update the second physical address information to the second register unit and the cache unit; and read the part or all of the second data from the second address space based on the obtained second offset address and the second physical address information by using the NDP core.

The cache unit 2124 is configured to: in a process of performing computation by the first NDP unit 212, cache the second physical address information pointing to the second address space 2113.

It should be understood that the second NDP unit 213 may be any NDP unit other than the first NDP unit 212, that is, the second address space 2113 may be any section of contiguous memory space other than the first address space 2112, and the second address space 2113 is a section of contiguous memory space allocated by the processor 220 to the second NDP unit 213.

Optionally, in hardware, the cache unit 2124 may be any one of a random access memory RAM or another memory. The random access memory RAM may include a static random access memory (SRAM) and a dynamic random access memory (DRAM). The cache unit 2124 may be logically a form used to store the second physical address and the second length.

The reading the part or all of the second data from the second address space based on the obtained second offset address and the second physical address information by using the NDP core further includes: The NDP core obtains the second physical address information from the second register unit 2123, and obtains the part or all of the second data from the second address space 2113 based on the second physical address information and the second offset address, to perform a next round of computation.

From the perspective of technical effects, in this application, the cache unit is disposed in the first NDP unit to cache the obtained second physical address information. Therefore, when the second physical address information needs to be used again in a subsequent computing process, the second physical address information may be directly obtained from the cache unit to compute a corresponding access address, so that data used for computation is read based on the access address obtained through computation. In this application, the foregoing cache mechanism is added to the near-data processing process. Therefore, a delay of the near-data processing process can be effectively reduced, and computing efficiency and an energy consumption ratio can be improved.

In an implementation, the second physical address information includes a fourth boundary address and a second length. When reading the part or all of the second data from the second address space based on the second offset address and the second physical address information by using the NDP core, the NDP core is configured to: read the fourth boundary address and the second length from the second register unit, where the fourth boundary address is a start physical address of the second address space or an end physical address of the second address space, and the second length is a length of the second address space; when the second offset address is less than or equal to the second length, obtain a second access address through computation based on the second offset address and the fourth boundary address; and read the part or all of the second data from the second access address in the second address space.

In an implementation, the second physical address information includes a fifth boundary address and a sixth boundary address. When reading the part or all of the second data from the second address space based on the second offset address and the second physical address information by using the NDP core, the NDP core is configured to: obtain a second access address through computation based on the second offset address and the fifth boundary address, or obtain the second access address through computation based on the second offset address and the sixth boundary address, where the fifth boundary address and the sixth boundary address are respectively a start physical address of the second address space and an end physical address of the second address space; and when the second access address is located between the fifth boundary address and the sixth boundary address, read the part or all of the first data from the second access address.

For a process in which the first NDP unit 212 computes the second access address by using the NDP core, refer to corresponding descriptions of the process in which the NDP core computes the first access address in the foregoing embodiment. Details are not described herein again.

The second offset address is an offset relative to the start physical address or the end physical address of the second address space.

From the perspective of technical effects, in the foregoing embodiment, it can be ensured that an access range is within the second address space and does not exceed the second address space by using the manner of accessing the second address space in the memory by the first NDP unit. This ensures security of the memory access process.

From the perspective of technical effects, the NDP unit in the data storage apparatus does not sense the first data that is cached in the processor and that is used for near-data processing. Therefore, when there is no other mechanism for ensuring cache coherence in this application, data in the first address space cached in the processor needs to be cleared, to avoid a cache coherence problem.

In an implementation, before the first NDP unit 212 obtains, from the first address space based on the first access address, the data used for computation, the processor 220 may clear the data in the first address space cached in the processor 220.

From the perspective of technical effects, because the first NDP unit 212 does not sense a cache structure of another component, before the first NDP unit 212 starts computation, the first NDP unit 212 needs to indicate the processor 220 to clear the data in the first address space cached by the processor 220, and does not access the data in the first address space cached by the processor 220 during subsequent computation, to avoid a cache coherence problem.

In an implementation, the first register unit and the second register unit each includes at least one register.

The register unit may be a high-speed storage device having data storage and data read/write functions, and a data read/write speed of the register unit is far higher than that of an external storage device such as a hard disk or a USB flash drive (the external storage device is a storage device other than a memory of a computing device and a processor cache). The register unit may be implemented by using a register having a high read/write speed.

A quantity of registers in each register unit needs to meet a requirement for storing address information.

When the first register unit 2122 includes one register and the first physical address information includes two types of information, the first physical address information may be stored in the register. For example, in a 64-bit register, 48 bits may indicate the first boundary address, and remaining 16 bits indicate the length of the first address space, that is, the first length; or 32 bits indicate the first boundary address, and remaining 32 bits indicate the second boundary address. When the first register unit 2122 includes two registers, the two registers may be configured to respectively store two types of information (the first boundary address and the first length, or the second boundary address and the third boundary address) in the first physical address information. Similarly, the second register unit may alternatively store the second physical address information in a manner the same as that of the first register unit, and details are not described herein again.

From the perspective of technical effects, in this application, the first physical address information pointing to the first address space 2112 in the memory 211 is stored in a hardware register. Information in the hardware register is difficult to be tampered with, and security is high. Therefore, in this application, security of completing computation of the first access address based on hardware logic is high. In addition, when the computational logic of the first access address in this application is used, an access range of the first NDP unit 212 in the memory 211 may not exceed the contiguous memory space to which the first physical address information points. This ensures security of a process in which the memory 211 is accessed. Similarly, security of accessing another address space in the memory 211 by the first NDP unit 212 may also be ensured.

Optionally, in this application, simple hardware logic may be further added to control access permissions of different blocks in the first address space, to enhance security. For example, a memory protection unit (MPU) may be added to control a read/write permission of the code block and the data block in the first address space. Similarly, different access permissions may also be set for a data block and a code block in another address space. Details are not described herein again.

In an implementation, the first NDP unit is further configured to send a signal to the processor through the bus after near-data processing. The signal indicates that the first NDP unit has completed near-data processing.

After completing the near-data processing task (which may include one or more rounds of computing processes) allocated by the processor 220 to the first NDP unit 212, the first NDP unit 212 may send a signal to the processor 220 through the bus 230.

Optionally, after the processor 220 receives the signal, the processor 220 may maintain a counter. After receiving a signal sent by an NDP unit, the processor 220 increases a value of the counter by 1, and correspondingly stores an identifier of the NDP unit. The identifier may be a number of the NDP unit.

Figure 6:
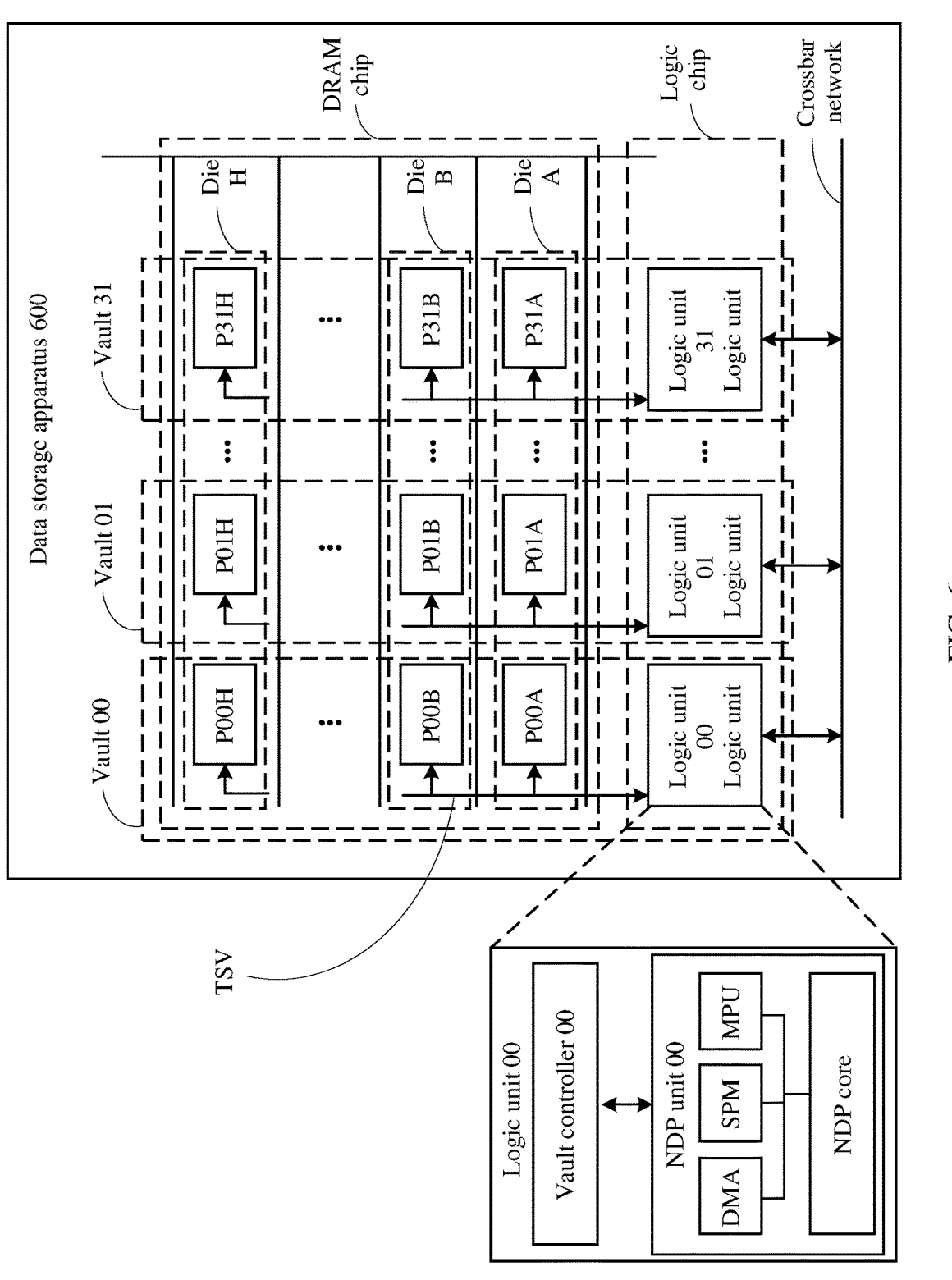
FIG. 6 is a diagram of a structure of hardware of a data storage apparatus according to an embodiment of this appli- cation.

FIG. 6 is a diagram of a structure of hardware of a data storage apparatus according to an embodiment of this application. The data storage apparatus 600 is a storage apparatus based on a hybrid memory cube (HMC). The data storage apparatus 600 may be applied to the data processing apparatus in FIG. 1, FIG. 2, FIG. 3, or FIG. 5, and is used as a data storage apparatus in the data processing apparatus.

As shown in FIG. 6, the data storage apparatus 600 includes eight layers of stacked DRAM chips (namely, a die A to a die H in FIG. 6) and one layer of logic chip. The eight layers of stacked DRAM chips are used as memories, and may correspond to the memory 211 in the foregoing embodiment. The logic chip is used as a control unit, and may include the first NDP unit in embodiments in FIG. 2 and FIG. 3 or the E NDP units in the embodiment in FIG. 5. The chips at each layer may be connected through a through silicon via (TSV). Each layer of chips in the data storage apparatus 600 may be logically divided into several units (as shown in FIG. 6, each layer is divided into 32 areas, for example, the die A is divided into 32 areas from P00A to P31A, and the logic chip is divided into 32 logical units). A multi-layer memory and a logical unit in a vertical direction form a vault. The data storage apparatus 600 may be divided into 32 vaults (a vault 00 to a vault 31), and the vault 00 includes a logical unit 00 and eight memories (P00A to P00H) in a vertical direction.

Vaults are connected by using an internal crossbar network, and the crossbar network communicates with a processor (not shown in FIG. 6) through a bus (a high-speed serial link). The data storage apparatus 600 may be a storage apparatus of an 8 GB specification, a data capacity of a DRAM chip at each layer is 1 GB, and the crossbar network is connected to a device outside the data storage apparatus 600 through eight 40 GB/s high-speed serial links.

As shown in FIG. 6, the vault 00 is used as an example. The logical unit 00 inside the vault 00 includes a vault controller VC 00 (VC) and an NDP unit 00. The VC 00 is integrated in the logic unit 00, and is responsible for a data read/write operation inside the vault 00. The NDP unit may include a near-data processing core (NDP Core), a scratchpad memory (SPM), a memory protection unit (MPU), and a direct memory access (DMA) engine. In addition, each NDP 00 unit may further include a first register unit, a second register unit, and a cache unit, which are not shown in FIG. 6 for simplicity. It should be understood that an internal structure of another logical unit may be the same as that of the logical unit 00, and details are not described herein again.

Figure 7:
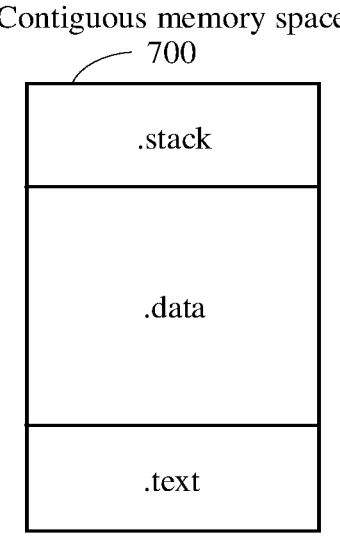
FIG. 7 is a diagram of a spatial layout of contiguous memory space according to an embodiment of this applica- tion.

FIG. 7 is a diagram of a spatial layout of contiguous memory space according to an embodiment of this application. The contiguous memory space 700 shown in FIG. 7 may be a section of contiguous physical address space in a memory in a vault. In an initialization process, the physical address space is allocated to an NDP unit in the vault. As shown in FIG. 7, the contiguous memory space includes: a .text area, a .data area, and a .stack area. The text area is used to store machine instructions obtained by compiling source code of a computing task, and corresponds to the code block in the foregoing embodiment. The .data area is used to store data, and corresponds to the data block in the foregoing embodiment. The .stack area is reserved stack space.

The following uses the contiguous memory space 700 in FIG. 7 as an example to describe an initialization process (that is, a distribution process of a near-data processing task).

First, the processor may dynamically distribute a computing task to NDP units in each vault through a bus based on a computing requirement and a load status of the system. The processor may allocate a section of contiguous memory space to each NDP unit at a time by running a segment of initialization code, and then write corresponding data used for near-data processing into the contiguous memory space corresponding to each NDP unit.

A process in which the processor writes the corresponding data used for near-data processing into each section of contiguous memory space may include: computing logic distribution and computing data distribution. The contiguous memory space 700 is used as an example. During computing logic distribution, the processor writes compiled source code of a binary computing task into the text area in the contiguous memory space 700, and then disposes a PC register in the NDP core to store a corresponding offset address. When performing computing data distribution, the processor writes the corresponding data into the .data area in the contiguous memory space 700. It should be noted that, if a data division and data distribution policy selected in a memory allocation phase is reasonable, the processor may have completed a process of distributing computing data when processing another computing task. In this case, only computing logic distribution needs to be performed.

After the processor completes distribution of the near-data processing task to each NDP unit, each NDP unit may independently start computation. In a computing process performed by the NDP unit shown in FIG. 6, the SPM is configured to store data required for running the NDP unit; the MPU is configured to provide protection for data in the memory, that is, allocate different access permissions to different areas in the contiguous memory space; and the DMA engine is configured to implement data migration between the memory and the SPM.

Figure 8:
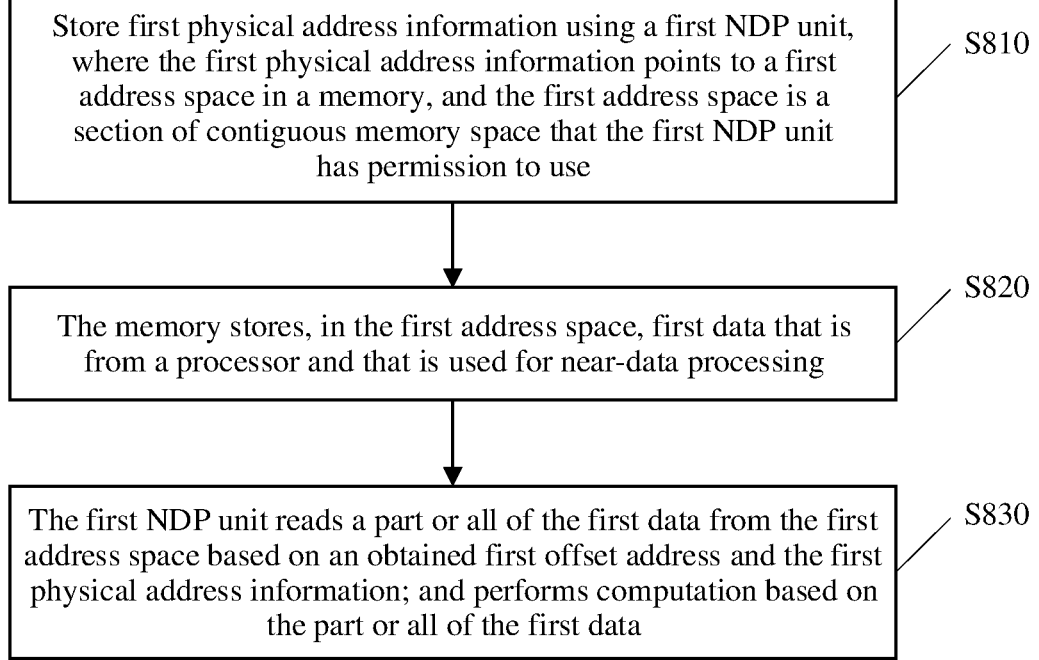
FIG. 8 is a flowchart of a data processing method accord- ing to an embodiment of this application.

FIG. 8 is a flowchart of a data processing method according to an embodiment of this application. The method is applied to a data storage apparatus. The data storage apparatus includes a memory and a first near-data processing NDP unit, the first NDP unit is electrically connected to the memory, and the data storage apparatus is connected to a processor through a bus. The method includes the following steps.

Step S810: Store first physical address information by using the first NDP unit, where the first physical address information points to first address space in the memory, and the first address space is a section of contiguous memory space that the first NDP unit has permission to use.

Step S820: The memory stores, in the first address space, first data that is from the processor and that is used for near-data processing.

Step S830: The first NDP unit reads a part or all of the first data from the first address space based on an obtained first offset address and the first physical address information; and performs computation based on the part or all of the first data.

In an implementation, the first NDP unit includes a first register unit and a near-data processing core NDP core. The storing first physical address information by using the first NDP unit includes: storing a first physical base address and a first length by using the first register unit. That the first NDP unit reads a part or all of the first data from the first address space based on an obtained first offset address and the first physical address information includes: The NDP core obtains the first physical address information from the first register unit, and reads the part or all of the first data from the first address space based on the first physical address information and the first offset address.

In an implementation, the first physical address information includes a first boundary address and a first length. The reading the part or all of the first data from the first address space based on the first physical address information and the first offset address includes: When the first offset address is less than or equal to the first length, the NDP core obtains a first access address through computation based on the first offset address and the first boundary address, where the first boundary address is a start physical address of the first address space or an end physical address of the first address space, and the first length is a length of the first address space; and the NDP core reads the part or all of the first data from the first access address in the first address space.

In an implementation, the first physical address information includes a second boundary address and a third boundary address. The reading the part or all of the first data from the first address space based on the first physical address information and the first offset address includes: The NDP core obtains a first access address through computation based on the first offset address and the second boundary address, or obtains the first access address through computation based on the first offset address and the third boundary address, where the second boundary address and the third boundary address are respectively a start physical address of the first address space and an end physical address of the first address space; and when the first access address is located between the second boundary address and the third boundary address, the NDP core reads the part or all of the first data from the first access address.

In an implementation, the data storage apparatus further includes a second NDP unit, and the second NDP unit is electrically connected to the memory. The method further includes: storing second physical address information by using the second NDP unit. The second physical address information points to second address space in the memory, and the second address space is a section of contiguous memory space that the second NDP unit has permission to use. The memory stores, in the second address space, second data that is from the processor and that is used for near-data processing. The first NDP unit reads a part or all of the second data from the second address space based on an obtained second offset address and the second physical address information; and performs computation based on the part or all of the second data.

In an implementation, the method further includes: The memory receives instructions of the processor. The instructions instruct the memory to allocate the first address space to the first NDP unit, and instruct the memory to allocate the second address space to the second NDP unit.

In an implementation, the first NDP unit further includes a second register unit and a cache unit. The reading a part or all of the second data from the second address space based on an obtained second offset address and the second physical address information includes: when the cache unit caches the second physical address information, obtaining the second physical address information from the cache unit by using the NDP core, and updating the second physical address information to the second register unit; and reading the part or all of the second data from the second address space based on the second offset address and the second physical address information by using the NDP core; or when the cache unit does not cache the second physical address information, obtaining the second physical address information from the second NDP unit by using the NDP core, and updating the second physical address information to the second register unit and the cache unit; and reading the part or all of the second data from the second address space based on the second offset address and the second physical address information by using the NDP core.

In an implementation, the second physical address information includes a fourth boundary address and a second length. The reading the part or all of the second data from the second address space based on the second offset address and the second physical address information by using the NDP core includes: reading the fourth boundary address and the second length from the second register unit by using the NDP core. The fourth boundary address is a start physical address of the second address space or an end physical address of the second address space, and the second length is a length of the second address space. When the second offset address is less than or equal to the second length, the NDP core obtains a second access address through computation based on the second offset address and the fourth boundary address; and the NDP core reads the part or all of the second data from the second access address in the second address space. In an implementation, the second physical address information includes a fifth boundary address and a sixth boundary address. The reading the part or all of the second data from the second address space based on the second offset address and the second physical address information by using the NDP core includes: The NDP core obtains a second access address through computation based on the second offset address and the fifth boundary address, or obtains the second access address through computation based on the second offset address and the sixth boundary address, where the fifth boundary address and the sixth boundary address are respectively a start physical address of the second address space and an end physical address of the second address space; and when the second access address is located between the fifth boundary address and the sixth boundary address, the NDP core reads the part or all of the first data from the second access address.

In an implementation, the first register unit and the second register unit each includes at least one register.

In an implementation, the method further includes: The first NDP unit sends a signal to the processor through the bus after the first NDP unit completes near-data processing. The signal indicates that the first NDP unit has completed near-data processing.

An embodiment of this application provides a data processing apparatus, including a processor, the data storage apparatus according to any implementation of the foregoing embodiments, and a discrete component coupled to the data storage apparatus. The data processing apparatus may be the data processing apparatus according to any one of the foregoing embodiments in FIG. 2, FIG. 3, and FIG. 5.

An embodiment of this application provides a computer storage medium. The computer storage medium stores a computer program. When the computer program is executed, the first NDP unit 212 may perform some or all of the steps described in any one of the foregoing method embodiments, to complete the foregoing computing process.

An embodiment of this application provides a computer program. The computer program includes instructions. When the computer program is executed by the processor or the first NDP unit 212, the first NDP unit 212 is enabled to perform some or all of the steps described in any one of the foregoing method embodiments.

In the foregoing embodiments, the description of each embodiment has respective focuses. For a part that is not described in detail in an embodiment, reference may be made to related descriptions in other embodiments. It should be noted that, for ease of description, the foregoing method embodiments are described as a series of combinations of actions. However, a person skilled in the art should be aware that this application is not limited to the described order of the actions, because some steps may be performed in another order or simultaneously according to this application. It should be further appreciated by a person skilled in the art that embodiments described in this specification all belong to example embodiments, and the involved actions and modules are not necessarily required by this application.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A data storage apparatus, comprising:
a memory storing instructions;
a first near-data processing (NDP) unit, the first NDP unit being electrically connected to the memory;
the first NDP unit is configured to store first physical address information, the first physical address information pointing to a first address space in the memory, the first address space comprising a contiguous memory space section allocated by at least one processor of the data storage apparatus to the first NDP unit;
the memory is configured to store, in the first address space, first data that is from the processor and that is used for near-data processing; and
the first NDP unit is further configured to:
read at least a portion of the first data from the first address space based on an obtained first offset address and the first physical address information, wherein the first offset address comprises an offset relative to a start physical address or an end physical address of the first address space; and
perform computation based on the at least a portion of the first data.

2. The apparatus according to claim 1, wherein the first NDP unit comprises a first register unit and a near-data processing (NDP) core, the first NDP unit being configured to:
store the first physical address information using the first register unit;
obtain the first physical address information from the first register unit using the NDP core; and
read the at least a portion of the first data from the first address space based on the first physical address information and the first offset address.

3. The apparatus according to claim 2, wherein the first physical address information comprises a first boundary address and a first length, and the NDP core is configured to:
when the first offset address is less than or equal to the first length, obtain a first access address through computation based on the first offset address and the first boundary address, wherein the first boundary address is a start physical address of the first address space or an end physical address of the first address space, and the first length is a length of the first address space; and
read the at least a portion of the first data from the first access address in the first address space.

4. The apparatus according to claim 2, wherein the first physical address information comprises a second boundary address and a third boundary address, and the NDP core is configured to:
obtain a first access address through computation based on the first offset address and the second boundary address, or obtain the first access address through computation based on the first offset address and the third boundary address, wherein the second boundary address and the third boundary address comprise a start physical address of the first address space and an end physical address of the first address space, respectively; and
when the first access address is located between the second boundary address and the third boundary address, read the at least a portion of the first data from the first access address.

5. The apparatus according to claim 1, wherein the data storage apparatus further comprises a second NDP unit, the second NDP unit being electrically connected to the memory;
the second NDP unit is configured to store second physical address information, the second physical address information pointing to second address space in the memory, and the second address space comprising a contiguous memory space section that the second NDP unit has permission to use;

the memory is configured to store, in the second address space, second data that is from the processor and that is used for near-data processing; and the first NDP unit is further configured to:

read the at least a portion of the second data from the second address space based on an obtained second offset address and the second physical address information; and perform computation based on the at least a portion of the second data.

6. The apparatus according to claim 5, wherein the memory is further configured to:

receive instructions of the processor, the instructions instructing the memory to allocate the first address space to the first NDP unit, and instructing the memory to allocate the second address space to the second NDP unit.

7. The apparatus according to claim 5, wherein the first NDP unit further comprises a second register unit and a cache unit; and when the first NDP unit is further configured to read the at least a portion of the second data from the second address space based on the obtained second offset address and the second physical address information, the first NDP unit is configured to:

when the cache unit caches the second physical address information, obtain the second physical address information from the cache unit using the NDP core and update the second physical address information to the second register unit, and read the at least a portion of the second data from the second address space based on the second offset address and the second physical address information using the NDP core; or when the cache unit does not cache the second physical address information, obtain the second physical address information from the second NDP unit using the NDP core and update the second physical address information to the second register unit and the cache unit, and read the at least a portion of the second data from the second address space based on the second offset address and the second physical address information using the NDP core.

8. The apparatus according to claim 7, wherein the second physical address information comprises a fourth boundary address and a second length, and when reading the at least a portion of the second data from the second address space based on the second offset address and the second physical address information using the NDP core, the NDP core is configured to:

read the fourth boundary address and the second length from the second register unit, the fourth boundary address comprising a start physical address of the second address space or an end physical address of the second address space, and the second length is of the second address space;

when the second offset address is less than or equal to the second length, obtain a second access address through computation based on the second offset address and the fourth boundary address; and read the at least a portion of the second data from the second access address in the second address space.

9. The apparatus according to claim 7, wherein the second physical address information comprising a fifth boundary address and a sixth boundary address, and when reading the at least a portion of the second data from the second address space based on the second offset address and the second physical address information using the NDP core, the NDP core is configured to:

obtain a second access address through computation based on the second offset address and the fifth boundary address, or obtain the second access address through computation based on the second offset address and the sixth boundary address, the fifth boundary address and the sixth boundary address comprising a start physical address of the second address space and an end physical address of the second address space, respectively; and when the second access address is located between the fifth boundary address and the sixth boundary address, read the at least a portion of the first data from the second access address.

10. A data processing method for a data storage apparatus, the data storage apparatus comprising a memory storing instructions, a first near-data processing (NDP) unit electrically connected to the memory, and at least one processor in communication with the first NDP unit and the memory, the method comprising:

storing first physical address information using the first NDP unit, the first physical address information pointing to a first address space in the memory, the first address space comprising a contiguous memory space section allocated by the at least one processor of the data storage apparatus to the first NDP unit;

storing, by the memory in the first address space, first data that is from the processor and that is used for near-data processing; and reading, by the first NDP unit, at least a portion of the first data from the first address space based on an obtained first offset address and the first physical address information, wherein the first offset address comprises an offset relative to a start physical address or an end physical address of the first address space; and performing computation based on the at least a portion of the first data.

11. The method according to claim 10, wherein the first NDP unit comprises a first register unit and a near-data processing (NDP) core;

the storing the first physical address information using the first NDP unit comprises:

storing a first physical base address and a first length using the first register unit; and the reading, by the first NDP unit, the at least a portion of the first data from the first address space based on an obtained first offset address and the first physical address information comprises:

obtaining, by the NDP core, the first physical address information from the first register unit, and reading the at least a portion of the first data from the first address space based on the first physical address information and the first offset address.

12. The method according to claim 11, wherein the first physical address information comprises a first boundary address and a first length, and the reading the at least a portion of the first data from the first address space based on the first physical address information and the first offset address comprises:

when the first offset address is less than or equal to the first length, obtaining, by the NDP core, a first access address through computation based on the first offset address and the first boundary address, wherein the first boundary address is a start physical address of the first address space or an end physical address of the first address space, and the first length is a length of the first address space; and reading, by the NDP core, the at least a portion of the first data from the first access address in the first address space.

13. The method according to claim 11, wherein the first physical address information comprises a second boundary address and a third boundary address, and the reading the at least a portion of the first data from the first address space based on the first physical address information and the first offset address comprises:

obtaining, by the NDP core, a first access address through computation based on the first offset address and the second boundary address, or obtaining the first access address through computation based on the first offset address and the third boundary address, the second boundary address and the third boundary address comprise a start physical address of the first address space and an end physical address of the first address space, respectively; and when the first access address is located between the second boundary address and the third boundary address, reading, by the NDP core, the at least a portion of the first data from the first access address.

14. The method according to claim 10, wherein the data storage apparatus further comprises a second NDP unit, the second NDP unit being electrically connected to the memory, and the method further comprises:

storing second physical address information using the second NDP unit, the second physical address information pointing to second address space in the memory, and the second address space comprising a contiguous memory space section that the second NDP unit has permission to use;

storing, by the memory in the second address space, second data that is from the processor and that is used for near-data processing; and reading, by the first NDP unit, the at least a portion of the second data from the second address space based on an obtained second offset address and the second physical address information; and performing computation based on the at least a portion of the second data.

15. The method according to claim 14, wherein the method further comprises:

receiving, by the memory, instructions of the processor, the instructions instructing the memory to allocate the first address space to the first NDP unit, and instructing the memory to allocate the second address space to the second NDP unit.

16. The method according to claim 14, wherein the first NDP unit further comprises a second register unit and a cache unit, and the reading the at least a portion of the second data from the second address space based on the obtained second offset address and the second physical address information comprises:

when the cache unit caches the second physical address information, obtaining the second physical address information from the cache unit using the NDP core, and updating the second physical address information to the second register unit, and reading the at least a portion of the second data from the second address space based on the second offset address and the second physical address information using the NDP core; or when the cache unit does not cache the second physical address information, obtaining the second physical address information from the second NDP unit using the NDP core, and updating the second physical address information to the second register unit and the cache unit and reading the at least a portion of the second data from the second address space based on the second offset address and the second physical address information using the NDP core.

17. The method according to claim 16, wherein the second physical address information comprises a fourth boundary address and a second length; and the reading the at least a portion of the second data from the second address space based on the second offset address and the second physical address information using the NDP core comprises:

reading the fourth boundary address and the second length from the second register unit using the NDP core, the fourth boundary address comprising a start physical address of the second address space or an end physical address of the second address space, and the second length is a length of the second address space;

when the second offset address is less than or equal to the second length, obtaining, by the NDP core, a second access address through computation based on the second offset address and the fourth boundary address; and reading, by the NDP core, the at least a portion of the second data from the second access address in the second address space.

18. The method according to claim 16, wherein the second physical address information comprises a fifth boundary address and a sixth boundary address, and the reading the at least a portion of the second data from the second address space based on the second offset address and the second physical address information using the NDP core comprises:

obtaining, by the NDP core, a second access address through computation based on the second offset address and the fifth boundary address, or obtaining the second access address through computation based on the second offset address and the sixth boundary address, the fifth boundary address and the sixth boundary address comprising a start physical address of the second address space and an end physical address of the second address space, respectively; and when the second access address is located between the fifth boundary address and the sixth boundary address, reading, by the NDP core, the at least a portion of the first data from the second access address.

19. A non-transitory computer-readable media storing computer instructions, when executed by at least one processor, cause a data storage apparatus to:

store first physical address information using a first near-data processing (NDP) unit, the first physical address information pointing to a first address space in the memory, the first address space comprising a contiguous memory space section allocated by the at least one processor to the first NDP unit;

store, in the first address space, first data that is from the processor and that is used for near-data processing; and read, by using the first NDP unit, at least a portion of the first data from the first address space based on an obtained first offset address and the first physical address information, wherein the first offset address comprises an offset relative to a start physical address or an end physical address of the first address space; and perform computation based on the at least a portion of the first data.

20. The non-transitory computer-readable media according to claim 19, wherein the first NDP unit comprises a first register unit and a near-data processing (NDP) core;

the storing the first physical address information using the first NDP unit comprises:

storing a first physical base address and a first length using the first register unit; and the reading, by using the first NDP unit, the at least a portion of the first data from the first address space based on an obtained first offset address and the first physical address information comprises:

obtaining, by using the NDP core, the first physical address information from the first register unit, and reading the at least a portion of the first data from the first address space based on the first physical address information and the first offset address.

\* \* \* \* \*